Patented Jan. 1, 1935

1,986,183

UNITED STATES PATENT OFFICE 1,986,183

PIGMENT

Earl H. Bunce and George F. A. Stutz, Palmerton, Pa., assignors to The New Jersey Zinc Company, a corporation of New Jersey No Drawing. Application January 21, 1931, Serial No. 510,273

6 Claims. (Cl. 134—78)

This invention relates to pigments and has for its object the provision of an improved pigment composed of zinc sulfide and calcium sulfate and a method of making the same.

Pigments composed of co-precipitated water-insoluble compounds of zinc and calcium, such as zinc sulfide and calcium sulfate, are known but have heretofore attained little commercial success, because of the difficulty or excessive cost of their manufacture and their inferior quality (due to yellow tint and poor hiding power). It has heretofore been supposed that it was desirable or necessary to prepare pigments consisting of two different substances by co-precipitation (that is, simultaneous precipitation or the equivalent thereof) to secure sufficiently intimate and uniform mixing of the constituents. Such co-precipitation is difficult in the case of pigments consisting of calcium sulfate and zinc sulfide. It has, for example, been suggested that such a co-precipitate could be obtained by merely substituting calcium sulfide for barium sulfide in the well-known precipitation operation of lithopone manufacture, that is, by causing solutions of calcium sulfide and zinc sulfate to react as follows:

$$CaS + ZnSO_4 = CaSO_4 + ZnS$$

This method is impracticable because of the relative insolubility of calcium sulfide and because of the hydrolysis of calcium sulfide to form calcium sulfhydrate and calcium hydroxide (a substance that is relatively insoluble in water, instead of relatively soluble as is the barium hydroxide formed by the corresponding hydrolysis of barium sulfide):

$$2CaS + 2H_2O = Ca(SH)_2 + Ca(OH)_2$$
(water insoluble).

Attempts have been made to obviate these difficulties by using calcium polysulfide solutions, prepared by boiling flowers of sulfur in milk of lime, for the precipitation. The reaction of such solutions with zinc sulfate solutions results in the formation of a precipitate consisting of calcium sulfate, zinc sulfide and elemental sulfur. It is necessary to calcine precipitated zinc sulfide to impart desirable pigmentary properties thereto; now, though it has been alleged that the presence of this elemental sulfur is desirable during the calcination, practical experience has shown that it creates difficulties, which are particularly in evidence here since it is difficult to control the amount of precipitated sulfur present, on account of the notorious difficulty of preparing polysulfide solutions with a determinate sulfur content.

Attempts have also been made to obviate the difficulty caused by the insolubility of calcium sulfide by carrying out the precipitation with solutions of calcium chloride, sodium sulfide and zinc sulfate, with or without sodium sulfate, added to increase the proportion of calcium sulfate in the precipitate. Such methods involve precipitation in the presence of large amounts of soluble chlorides, which are adsorbed by the precipitate and have a deleterious effect on the light-fastness of the zinc sulfide, unless removed wholly or in large part by expensive and difficult purification operations such as thorough washing.

A mechanical equivalent of co-precipitation has also been suggested; this consists in preparing a suspension of calcium sulfate in zinc sulfate solution, and then precipitating zinc sulfide by adding sodium sulfide solution:

$$ZnSO_4 + Na_2S = ZnS + Na_2SO_4$$

The sodium sulfate produced by the above reaction is likewise adsorbed by the precipitate and produces difficulties with respect to the necessity of thorough purification of the precipitate similar to those produced by the chlorides in the methods discussed above.

As already mentioned, it is necessary to calcine precipitated zinc sulfide to impart to it suitable pigmentary properties. All of these methods of the prior art render it necessary to carry out this calcination of the zinc sulfide in the presence of the calcium sulfate. As a result of our investigations, we have determined that such a calcination has a disadvantageous effect on the pigment, producing an undesirable yellow tint and loss of hiding power; so that a zinc sulfide-calcium sulfate pigment produced by these methods is necessarily of low grade.

The present invention contemplates an improved pigment comprising a mixture of separately precipitated, or otherwise appropriately prepared, zinc sulfide and calcium sulfate, and is characterized by superior pigment properties and a lower cost of manufacture than the already known pigments composed of co-precipitated compounds of zinc and calcium. The pigment of the invention consists of a mechanical mixture of calcined zinc sulfide pigment and calcium sulfate pigment, which may be calcined or not.

In practicing the invention, the zinc sulfide pigment and the calcium sulfate pigment are separately prepared in any appropriate manner.

The two pigments are then mechanically mixed to produce a resulting homogeneous mixture of the zinc sulfide and calcium sulfate. The separately prepared pigments may be mixed dry, as in a squirrel cage disintegrator or the like, or may be mixed in the form of an aqueous pulp or slurry, as in a fine grinding pebble mill or the like. The relative proportions of zinc sulfide and calcium sulfate in the finished mixed pigment may be widely varied to meet the requirements and specifications of the mixed pigment with respect to hiding power, cost, etc. The higher the ratio of zinc sulfide to calcium sulfate in the finished mixed pigment, the higher will be the hiding power and the greater will be the cost of the finished product. A pigment of normally satisfactory properties is obtained with about 30% of zinc sulfide and 70% of calcium sulfate. A higher strength pigment, that is one possessing substantially greater hiding power, is obtained with approximately equal parts by weight of zinc sulfide and calcium sulfate.

While the calcium sulfate pigment may be prepared in any appropriate manner, an excellent material admirably adapted for the purposes of the invention is formed by the reaction of sulfuric acid on calcium oxide or calcium carbonate. In the preparation of this material, dilute sulfuric acid (5–10% $H_2SO_4$) is treated with a water suspension of calcium oxide or calcium carbonate until the acid is almost completely neutralized. This point in the reaction is indicated by a sudden thickening of the reaction mass. The precipitate is allowed to settle and the slight excess of acid is decanted off. The precipitate is washed with water by decantation or by counter-current washing to remove the remaining traces of acid, and is then ready for combination with the zinc sulfide.

The zinc sulfide pigment may be prepared in any appropriate manner. It is now our preferred practice to prepare this pigment in the manner described in the United States patent of Clayton W. Farber, No. 1,742,030, dated December 31, 1929.

The combination of the calcium sulfate with the zinc sulfide may be made at any point in the process after the zinc sulfide has been precipitated. For example, the calcium sulfate may be added in the dry form to the dry crude zinc sulfide before calcining; or, it may be added in the wet form to the wet muffled zinc sulfide after water quenching; or it may be added to the wet muffled and milled zinc sulfide; or it may be added in the dry form to the dry muffled and milled zinc sulfide. In cases where the yellow tint and low hiding power produced by calcining the calcium sulfate and zinc sulfide together are not disadvantageous on account of the particular use to which the pigment is to be put, the calcium sulfate may be added to the washed zinc sulfide pulp before calcining, or it may be added in the dry form to the dry crude zinc sulfide before calcining.

Chemically precipitated zinc sulfide requires a heat treatment or calcining operation in order to impart thereto certain desirable pigment properties. The calcium sulfate, on the other hand, requires no such heat treatment or calcination. In the course of our investigations, we have determined that the optimum results are secured in practicing the present invention by calcining the zinc sulfide pigment prior to the admixture of the calcium sulfate therewith. The calcium sulfate may be used either in calcined or uncalcined form.

We claim:

1. The method of making a mixed pigment of zinc and calcium compounds which consists in separately preparing a calcined zinc sulphide pigment and separately preparing an uncalcined calcium sulphate pigment, and mechanically mixing said separately prepared pigments of calcined zinc sulphide and uncalcined calcium sulphate to produce a homogeneous mixed pigment thereof.

2. The method of making a mixed pigment of zinc and calcium compounds which consists in separately preparing a calcined zinc sulphide pigment and separately preparing a calcined calcium sulphate pigment, and mechanically mixing said separately prepared pigments of calcined zinc sulphide and calcined calcium sulphate to produce a homogeneous mixed pigment thereof.

3. As a new article of manufacture, a pigment consisting of a mechanical admixture of calcined zinc sulfide pigment and uncalcined calcium sulfate pigment.

4. As a new article of manufacture, a pigment consisting of a mechanical admixture of calcined zinc sulphide pigment and calcium sulphate pigment, said admixture consisting of approximately 30% calcined zinc sulphide pigment and approximately 70% uncalcined calcium sulphate pigment.

5. As a new article of manufacture, a pigment consisting of a mechanical admixture of calcined zinc sulphide pigment and uncalcined calcium sulphate pigment, said two pigments being present in approximately equal parts by weight.

6. As a new article of manufacture, a pigment consisting of a mechanical admixture of calcined zinc sulfide pigment and uncalcined calcium sulfate pigment, the zinc sulfide pigment being present in the amount of 30–50% by weight and the calcium sulfate being present in the amount of 70–50% by weight.

EARL H. BUNCE.
GEORGE F. A. STUTZ.